US008751546B1

(12) United States Patent
Grieve

(10) Patent No.: US 8,751,546 B1
(45) Date of Patent: Jun. 10, 2014

(54) SYSTEMS AND METHODS FOR MINIMIZING THE EFFECTS OF GARBAGE COLLECTION

(75) Inventor: Andrew Alexander Grieve, Waterloo (CA)

(73) Assignee: Google Inc., Mountain View, CA (US)

( * ) Notice: Subject to any disclaimer, the term of this patent is extended or adjusted under 35 U.S.C. 154(b) by 120 days.

(21) Appl. No.: 13/345,483

(22) Filed: Jan. 6, 2012

(51) Int. Cl.
*G06F 12/00* (2006.01)
*G06F 17/30* (2006.01)

(52) U.S. Cl.
USPC .......................................... 707/813; 707/814

(58) Field of Classification Search
None
See application file for complete search history.

(56) References Cited

U.S. PATENT DOCUMENTS 5,819,304 A * 10/1998 Nilsen et al. ...................... 711/5
6,349,314 B1 * 2/2002 Patel .................................... 1/1
7,996,446 B2 * 8/2011 Bacon et al. .................. 707/816
2004/0248612 A1 * 12/2004 Lee et al. ................... 455/550.1
2008/0127212 A1 * 5/2008 Nakamizo et al. ............ 719/315
2009/0112953 A1 * 4/2009 Barsness et al. .............. 707/206
2010/0205230 A1 * 8/2010 Simeonov et al. ............ 707/813
2010/0262636 A1 * 10/2010 Bacon et al. .................. 707/813
2011/0264712 A1 * 10/2011 Ylonen ......................... 707/818
2012/0117406 A1 * 5/2012 Eun .............................. 713/323

* cited by examiner

*Primary Examiner* — Tony Mahmoudi
*Assistant Examiner* — Tuan A Pham
(74) *Attorney, Agent, or Firm* — Ropes & Gray LLP

(57) ABSTRACT

Apparent performance delays in a computer application are reduced by scheduling garbage collection during periods when a user cannot modify program data within the application. Garbage collection may be initiated in response to detecting a user interface event that prevents user modification of program data being processed by the computer application. Systems and methods herein reduce the appearance of performance delays associated with garbage collection.

20 Claims, 6 Drawing Sheets

500

502 DETECT FIRST UI EVENT

504 FIRST UI EVENT PREVENTS MODIFICATION OF DOCUMENT?

NO → 506 DELAY GARBAGE COLLECTION

YES → 508 INITIATE GARBAGE COLLECTION

510 DETECT SECOND UI EVENT

512 SECOND UI EVENT REENABLES MODIFICATION OF DOCUMENT?

NO → 514 CONTINUE GARBAGE COLLECTION

YES → 516 INTERRUPT GARBAGE COLLECTION

SYSTEMS AND METHODS FOR MINIMIZING THE EFFECTS OF GARBAGE COLLECTION

BACKGROUND OF THE INVENTION

This disclosure generally relates to methods and systems for minimizing the effects of garbage collection in a computing application. The methods and systems are particularly suitable for use in document processing or editing applications on mobile devices but are also generally applicable to any applications on any computing device.

Mobile devices such as smart phones and tablets typically have limited memory and processing power compared to desktop computers and servers. As a result, mobile device applications must be particularly careful in managing memory usage to be fast and responsive. Conventional mobile device applications often use a garbage collector to manage memory usage.

However, the garbage collector can cause significant performance problems. Typically, the garbage collector waits until the amount of available memory drops below a certain threshold before running a garbage collection pass. Unfortunately, running the garbage collector often prevents or slows user interaction with the application, resulting in noticeable delays to the user. Such delays are particularly substantial for mobile devices because garbage collection may occur often and may require more time to complete due to low memory and processing resources. These delays are undesirable and disruptive to users who want responsive and robust applications.

SUMMARY OF THE INVENTION

Thus, a need exists in the art for reducing the undesirable effects of garbage collection in computer applications. Accordingly, systems and methods are disclosed herein that schedule garbage collection during periods of time when a user cannot otherwise modify program data within the application. As a result, the effects of garbage collection are effectively masked or hidden, thereby reducing the appearance of any performance delays to the user. The systems and methods are particularly useful in document processing and editing applications on mobile devices, but are also generally applicable to any type of application, such as video games, email clients, or web browsers, running on any type of computing device.

According to one aspect, the invention relates to a method of scheduling garbage collection for a computer application. First, a computer running the computer application detects a user interface event. Next, the computer determines whether the user interface event prevents user modification of program data being processed by the computer application. In response to determining that the user interface event prevents user modification of the program data being processed by the computer application, the computer initiates garbage collection.

According to an additional aspect, the invention relates to a system for scheduling garbage collection for a computer application. The system includes a processor and a memory. The memory stores computer executable instructions, which when executed by the processor cause the processor to detect a user interface event and to determine whether the user interface event prevents user modification of program data being processed by the computer application. In response to determining that the user interface event prevents user modification of the program data being processed by the computer application, the computer executable instructions cause the processor to initiate garbage collection.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DESCRIPTION OF CERTAIN ILLUSTRATIVE EMBODIMENTS

To provide an overall understanding of the invention, certain illustrative embodiments will now be described, including systems and methods for minimizing the effects of garbage collection. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Overview

Aspects of the invention relate to systems and methods of garbage collection scheduling for a computer application. Some features of the invention minimize undesirable effects of garbage collection to a user of the application by scheduling garbage collection during periods of time when the user is unable to modify program data, e.g., during animations. Program data includes any type of data processed or used by a computer application, such as text, graphics, audio data, multimedia, metadata, or object data. For ease of explanation, the remainder of the application will refer primarily to interactions with electronic documents as one particular example of program data, though other forms of program data can be substituted without departing from the scope of the invention.

System Description

Figure 1:
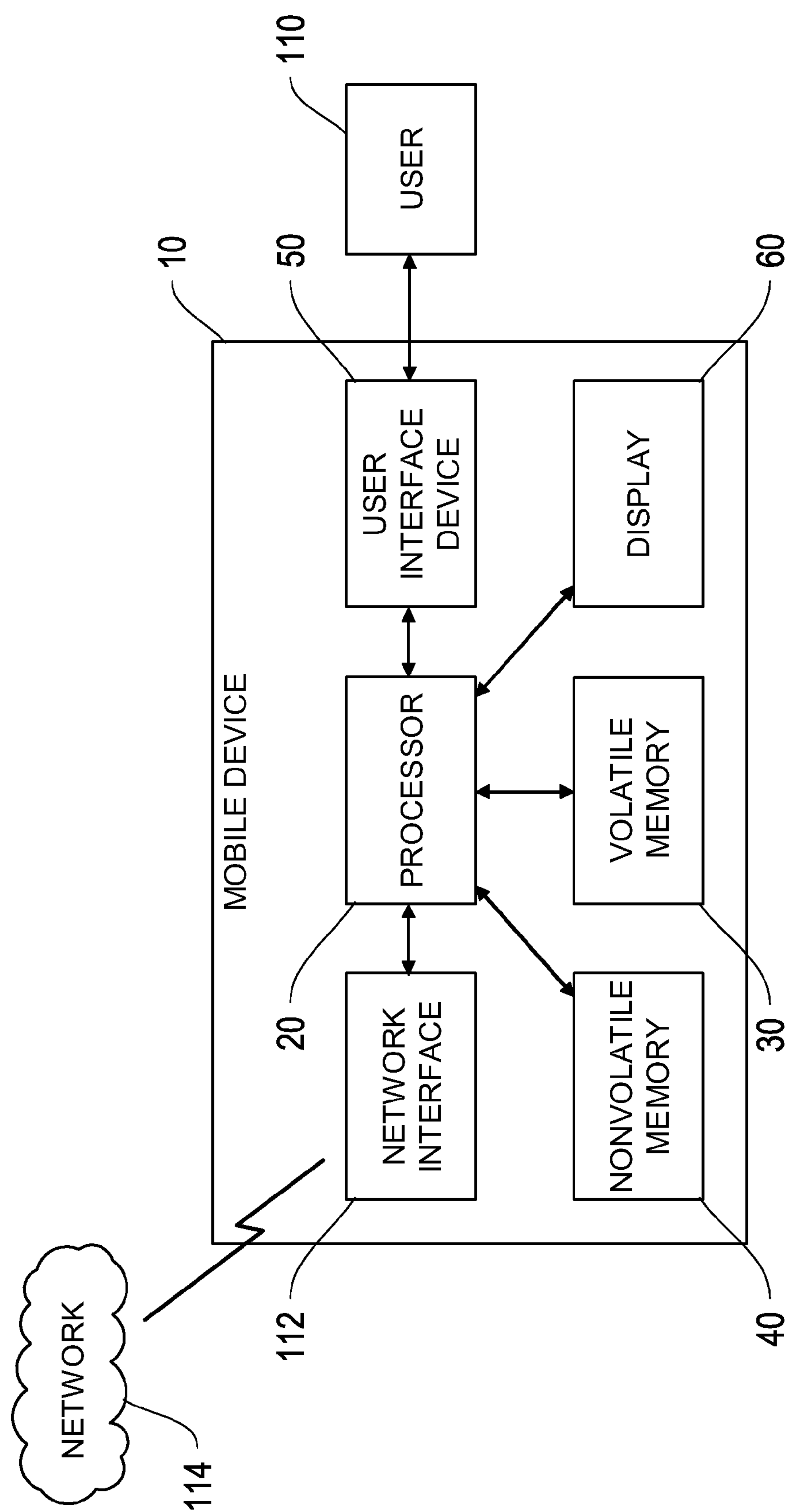
FIG. 1 is a block diagram of a mobile computing device suitable for use with the garbage scheduling system disclosed herein, according to an illustrative embodiment of the invention.

FIG. 1 is an exemplary diagram of a mobile device 10 in which concepts consistent with the principles of the invention may be implemented. The mobile device 10 includes a processor 20, a volatile memory 30, a non-volatile memory 40, a user interface device 50, a display 60, and a network interface 112. The mobile device 10 communicates with a network 114 via the network interface 112. The mobile device can generally interact with a user 110 via the user interface device, such as a touch screen incorporated into the display 60, and one or more mechanized buttons.

In the mobile device 10, the non-volatile memory 40 stores computer-executable instructions for a computer application. Examples of non-volatile memory include magnetic drives, integrated circuit memory (e.g., flash memory), or other non-volatile storage media known in the art. In order for the processor 20 to execute the instructions, the instructions are loaded into the volatile memory 30, such as device RAM or cache memory incorporated into the processor. At various times the application reads data from and writes data to both the non-volatile memory 40 and the volatile memory 30. The application also interacts with the network 114 via the network interface 112. The application is any type of software program, such as a document editor, a spreadsheet program, a presentation editor, a web browser, an email program, an operating system, or a video game.

Network interface 112 is any type of network interface, such as an Ethernet card, a wireless adapter, a Bluetooth adapter, or a cellular radio. Network 114 is any network, such as an intranet, the Internet, a local area network (LAN), a wide area network (WAN), a telephone network, or a combination of networks.

At certain times the user 110 is unable to modify the data within the application for a period of time, e.g., during an animation. During these times, the application performs garbage collection on the volatile memory 30, or a portion thereof, so that any delays caused by the garbage collection are substantially hidden from the user.

Figure 2:
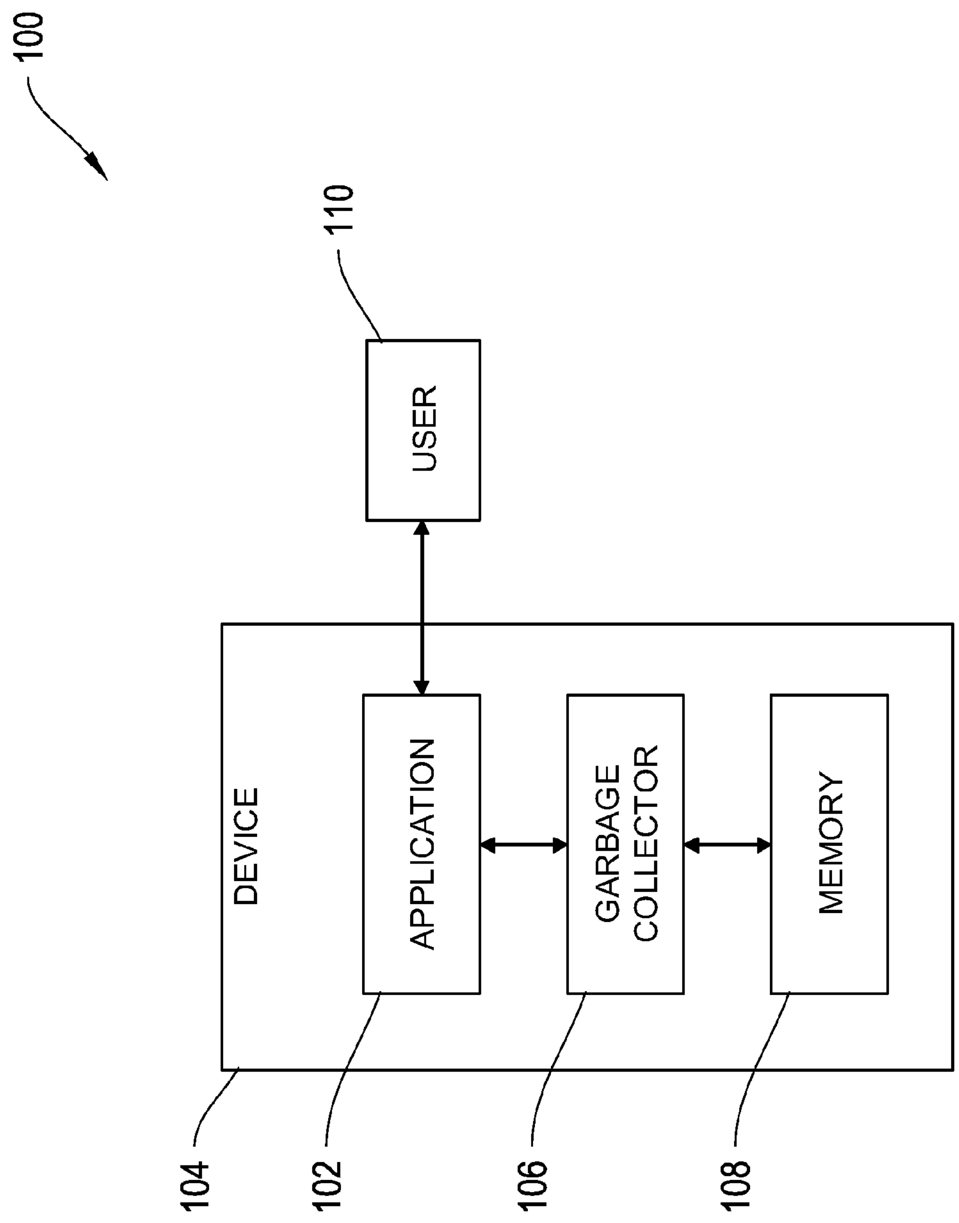
FIG. 2 is a block diagram of a garbage collection scheduling system for a computer application, according to an illustrative embodiment of the invention.

FIG. 2 shows a garbage collection scheduling system 100 in which concepts consistent with the principles of the invention may be implemented. The system 100 includes a computing device 104, which includes a computer application 102, a garbage collector 106, and a memory 108. The application 102 can run on any type of device, such as a personal computer, a laptop computer, a smart phone, a tablet, a personal digital assistant (PDA) or other type of computer or device. In some implementations, the memory 108 includes the portion of physical memory used by the software application 102. The system 100 interacts with a user 110 who interacts with the application 102. Application 102 is any type of computer application, such the examples described previously. In some embodiments, application 102 is implemented at least partly in a Java or Javascript architecture. In alternative embodiments, the garbage collector 106 is incorporated into the application 102 or into the device's operating system.

The user 110 generally interacts with the application 102 to process an electronic document. The application 102 accepts and processes user input from the user 110 by generating user interface events. Certain user interface events at best temporarily prevent the user from modifying the content of the document. Examples include user commands to scroll or pan in a window displaying the electronic document, to transition between portions of the electronic document, or to process and display a second electronic document. User commands to transition between portions of the electronic document include, for example, a command to process a new page of a document, a new slide of a presentation document, or a new sheet of a spreadsheet document.

In response to a user interface event generated by user input from the user 110, the application 102 applies a method to decide whether to instruct the garbage collector 106 to initiate a garbage collection process on the memory 108. This method is described in more detail below in the discussion of FIGS. 4-6.

The application 102 can also generally interact with the network 114 via the network interface 112 in FIG. 1. One example of the application 102 is an editor that stores electronic documents, such as text files, spreadsheet files, or presentation files, on a server or collection of servers connected to the network 114. The application 102 transmits changes to the electronic documents to the servers via the network interface 112 and the network 114. The application 102 can also store local copies of such electronic documents.

Figure 3:
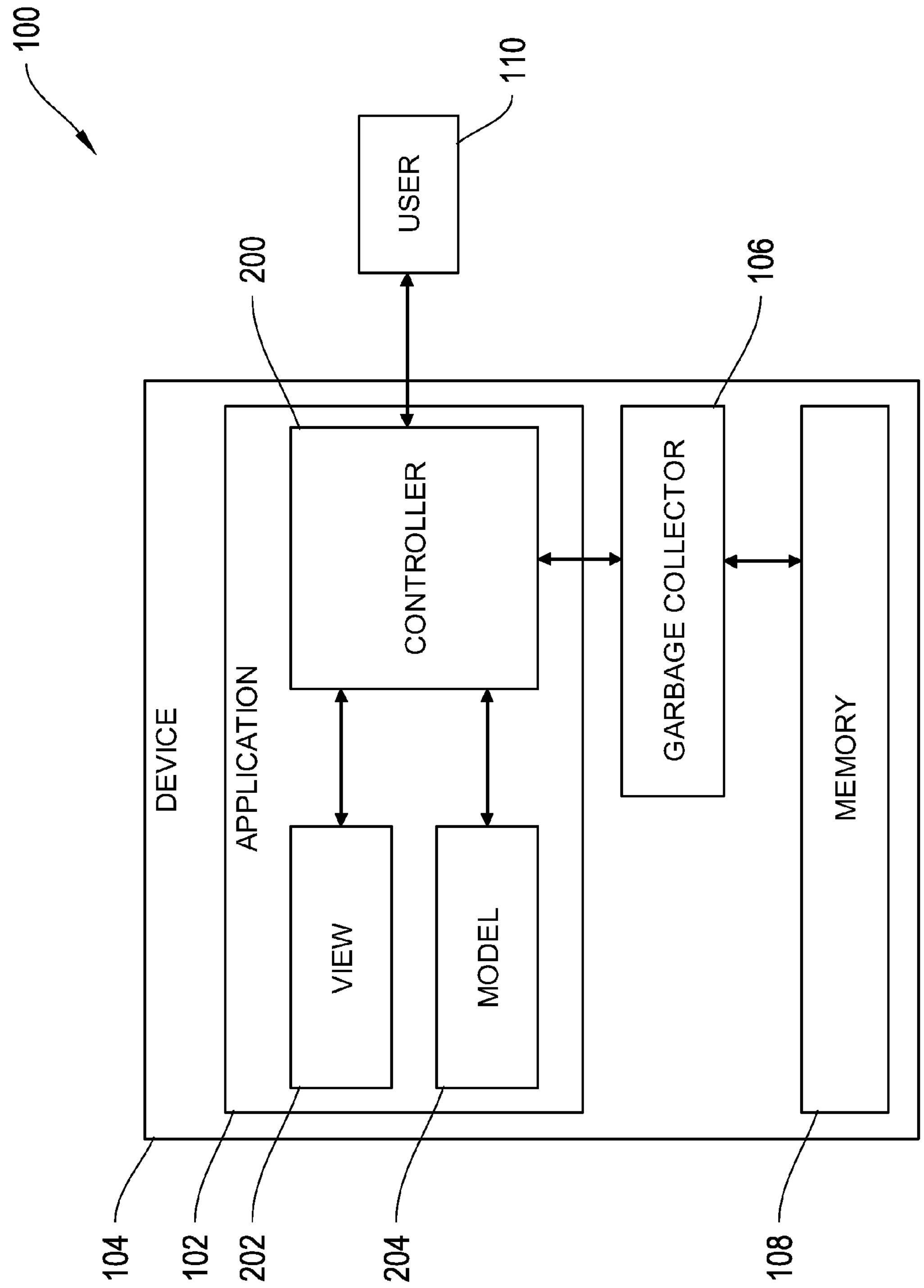
FIG. 3 is a more detailed block diagram of the garbage collection scheduling system of FIG. 2, according to an illustrative embodiment of the invention.

FIG. 3 is an alternative view of the garbage collection scheduling system of FIG. 1, showing a more detailed view of the architecture of one implementation of the application 102 according to an illustrative embodiment of the invention. The application 102 utilizes a model-view-controller architecture commonly known in the art that includes a controller logic 200, a view logic 202, and a model logic 204. The controller logic 200 contains logic for generally interacting with the user 110, the view logic 202, and the model logic 204 to manage functions and the data of the application 102. The view logic 202 manages and provides the visual output of the application to the user 110 for supplying a graphical user interface, or providing other visual functionality. The model logic 204 manages and stores the data of the application 102.

FIG. 3 shows a model-view-controller embodiment for the application 102 by way of example only. Numerous alternative types of architectures may be used without departing from the invention.

One example of the application 102 is a text editing program running on a mobile device. The application 102 includes an implementation of a Javascript engine or other framework for functionality such as data manipulation and memory management. The garbage collector 106 is built into the Javascript engine. In this example, the model logic 204 manages and stores the data associated with an electronic document being processed by the application 102. Similarly, the view logic 202 manages and displays a visual representation of the electronic document, e.g. in a graphical window displaying the electronic document with an interactive editing interface. The controller logic 200 accepts and processes user input. For example, if the user input is a command to scroll the electronic document to a new page, the controller logic 200 will instruct the view logic 202 to perform a scrolling animation and display the new page. In addition, the controller logic 200 will apply a method to determine whether or not to instruct the Javascript engine's garbage collector 106 to initiate a garbage collection process on the memory 108. This method is described in more detail below.

In some implementations, the controller logic 200, the view logic 202, and the model logic 204 run in separate portions of memory, such as the memory 108. The garbage collector 106 can initiate the garbage collection process on a portion of the memory 108, e.g., the portion containing the view logic 202 or the portion containing the model logic 204.

Figure 4:
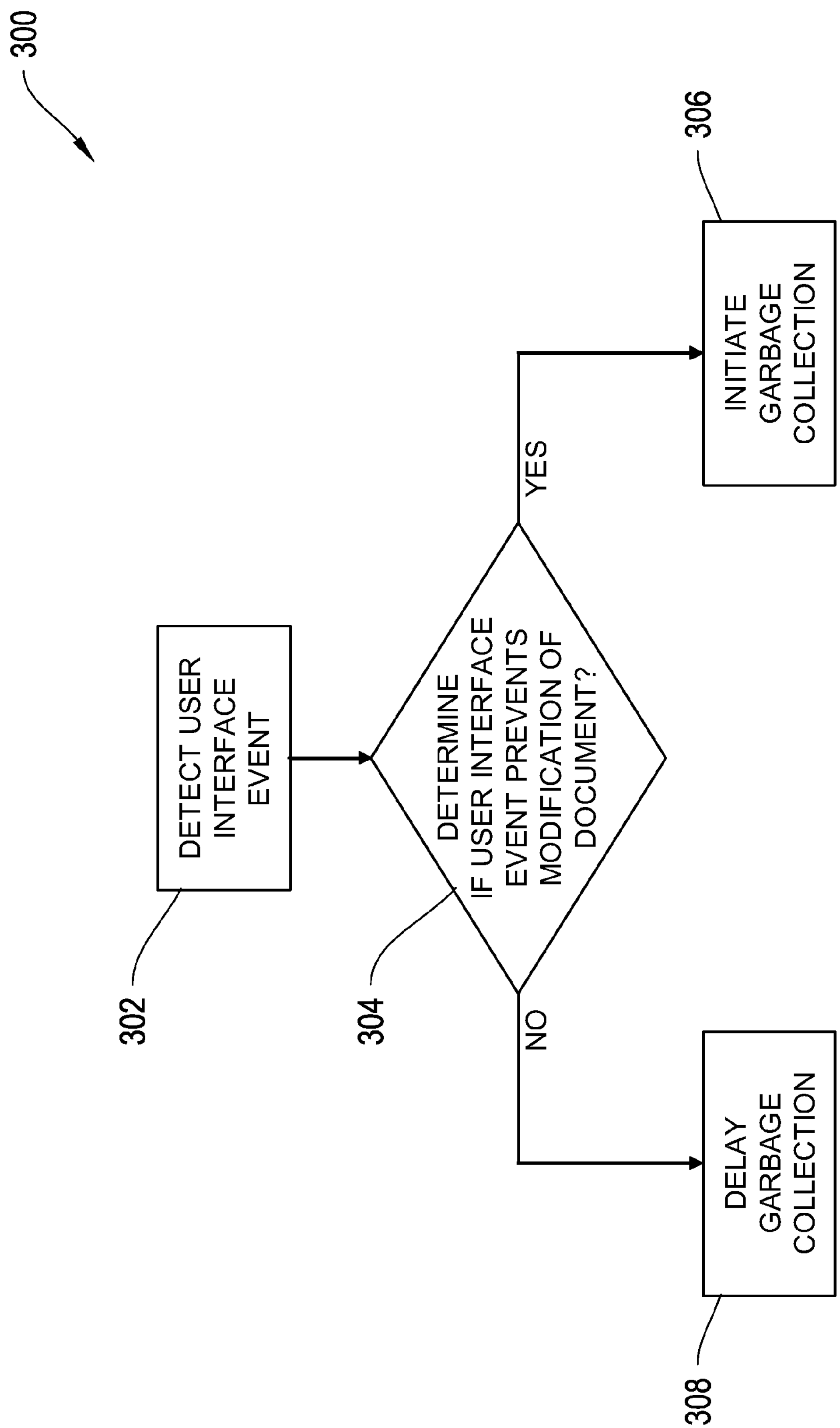
FIG. 4 is a flowchart of a method of scheduling garbage collection by the system of FIGS. 1-3, according to an illustrative embodiment of the invention.

FIG. 4 is a flowchart of a method 300 of scheduling garbage collection by the system of FIGS. 1-3, according to an illustrative embodiment of the invention. First, an application, such as the application 102, detects a user interface event (step 302). As indicated above, the user interface event may be generated by user input from a user, such as the user 110. Also, as discussed above, a component of the application 102, such as the controller logic 200, can perform the detection of the user interface event. Examples of the user interface event include a scrolling or panning of a graphical window, a mouse click on a button within a user interface, a modification of a text field, or any other type of user interface event.

Next, the application 102 determines if the user interface event prevents modification of an electronic document being processed by the application 102 (step 304). In one example, a scrolling or panning of a graphic window displaying the electronic document prevents modification of the document for an amount of time while the scrolling or panning is occurring. Similarly, in another example, a transition between successive slides of an electronic presentation prevents modification of the presentation for an amount of time.

If the user interface event prevents modification of the electronic document, then the garbage collector 106 is instructed to initiate a garbage collection process on the memory 108 (step 306). Otherwise, garbage collection is delayed (step 308).

In one implementation, the application 102 instructs the garbage collector 106 to initiate garbage collection if the user interface event prevents modification of the electronic document for at least a predetermined amount of time. The length of the predetermined amount of time may be defined statically or determined dynamically, for example, based on statistical and/or historical performance data of garbage collection and user interactions. For example, the application 102 or a human derives a value for the length of the predetermined amount of time from the average time or the maximum time for garbage collection processes running on the memory 108 to complete. Thus a garbage collection process will generally be masked by the user interface event and will thus avoid creating a noticeable pause to the user 110. The length of time associated with the user interface event may be determined deterministically in advance, or statistically based on average event times. For example, the application 102 may track the average length of user pan or scroll events to predict whether such an event will be long enough to justify initiating the garbage collection.

Figure 5:
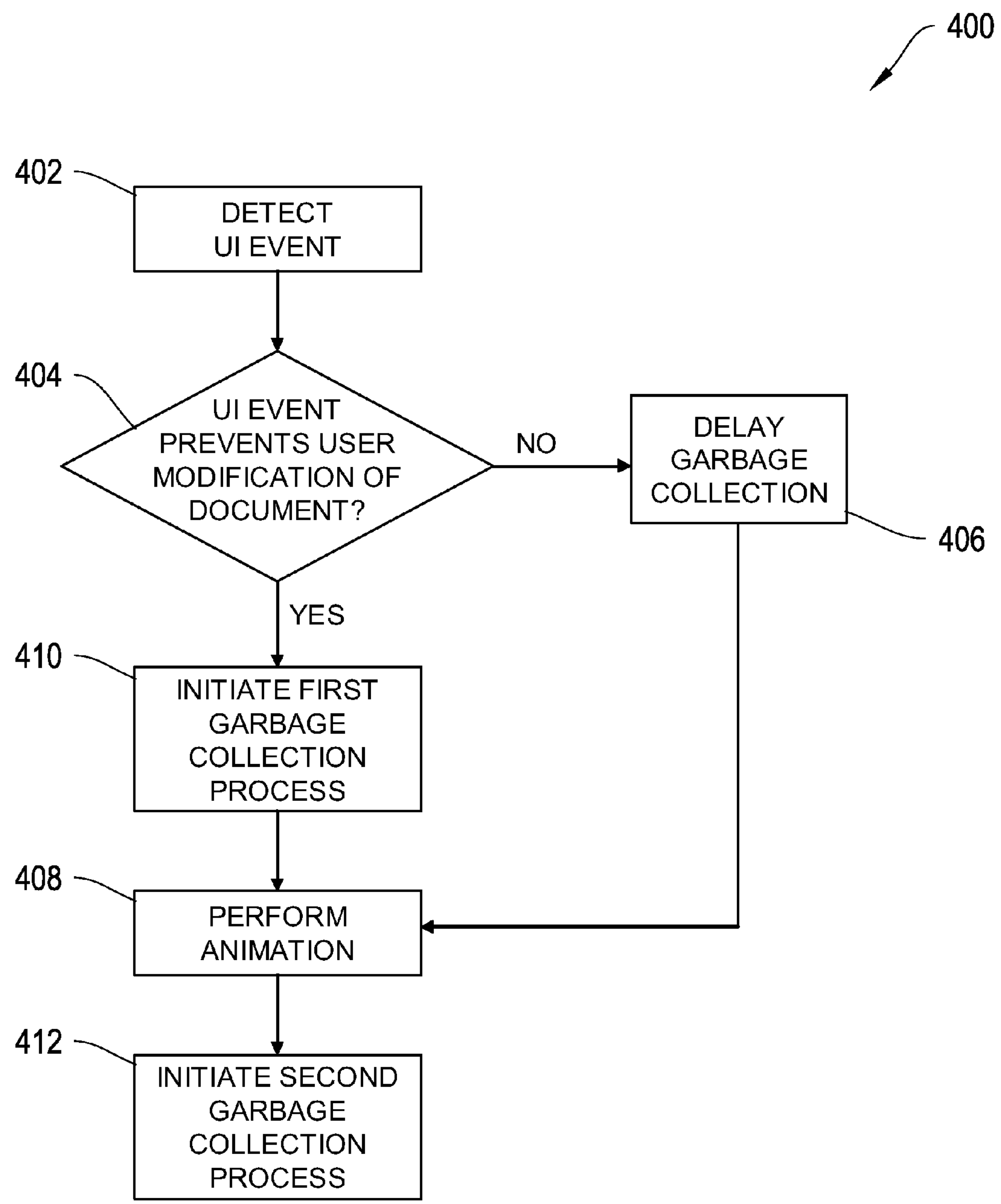
FIG. 5 is a more detailed flowchart of one particular method of scheduling garbage collection during an animation caused by a user interface event, according to an illustrative embodiment of the invention.

FIG. 5 is a more detailed flowchart of one particular method 400 of scheduling garbage collection during an animation caused by a user interface event, according to an illustrative embodiment of the invention. First, an application, such as the application 102, detects a user interface event (step 402). The user interface event is associated with an animation that is performed by the application 102 when the user interface event occurs. Examples of user interface events that result in an animation include scrolling or panning of a graphical window. Similar to the method 300, the user interface event may be generated by user input from a user, such as the user 110. Also, as discussed above, a component of the application 102, such as the controller logic 200, can perform the detection of the user interface event.

Next, the application 102 determines if the user interface event prevents modification of an electronic document being processed by the application 102 (step 404). Similar to the method 300, examples of a user interface event that prevents modification of the electronic document include, without limitation, scrolling or panning of a graphic window, transitioning between successive slides of a presentation, opening a new document, and displaying an animation while executing a function.

As described above, in one implementation, the application 102 determines if the user interface event prevents modification of an electronic document for at least a predetermined amount of time. The application 102 defines the predetermined amount of time, for example, to be the average time or maximum time required to complete a garbage collection process on the memory 108. In this implementation, the application 102 compares the amount of time required to perform the animation associated with the user interface event to the predetermined amount of time. The amount of time required to perform the animation may be determined from historical or statistical data of the length of time of various user interface events. If the performance time of the animation exceeds the predetermined amount of time required for garbage collection, then the animation will substantially mask the garbage collection process, rendering the garbage collection substantially imperceptible to the user 110.

If the user interface event does not prevent modification of the document for at least the predetermined amount of time, then garbage collection is delayed (step 406). Otherwise, the application 102 instructs the garbage collector 106 to initiate a first garbage collection process on the memory 108 (step 410). In one implementation, the first garbage collection process is restricted to a portion of the memory 108 that is not used to implement the animation, e.g., the portion of the memory assigned to the model logic 204.

Regardless of whether garbage collection is initiated or delayed, the application 102 performs the animation (step 408). In one implementation, the animation is rendered in the view logic 200. In some implementations, the application 102 scales the performance time of the animation to last the expected or actual duration of the first garbage collection process. In various implementations, if the animation completes before the first garbage collection process finishes, then the application 102 continues to prevent modification to the electronic document until the first garbage collection finishes.

After the animation is complete, the application 102 instructs the garbage collector 106 to initiate a second garbage collection process on the remaining portion of the memory 108 that was used to implement the animation. In some implementations, the second garbage collection process occurs some time after the animation completes.

In various implementations, one or more components of the application 102, such as the application 102 or the controller logic 200, performs one or more of the steps of the method 400.

Figure 6:
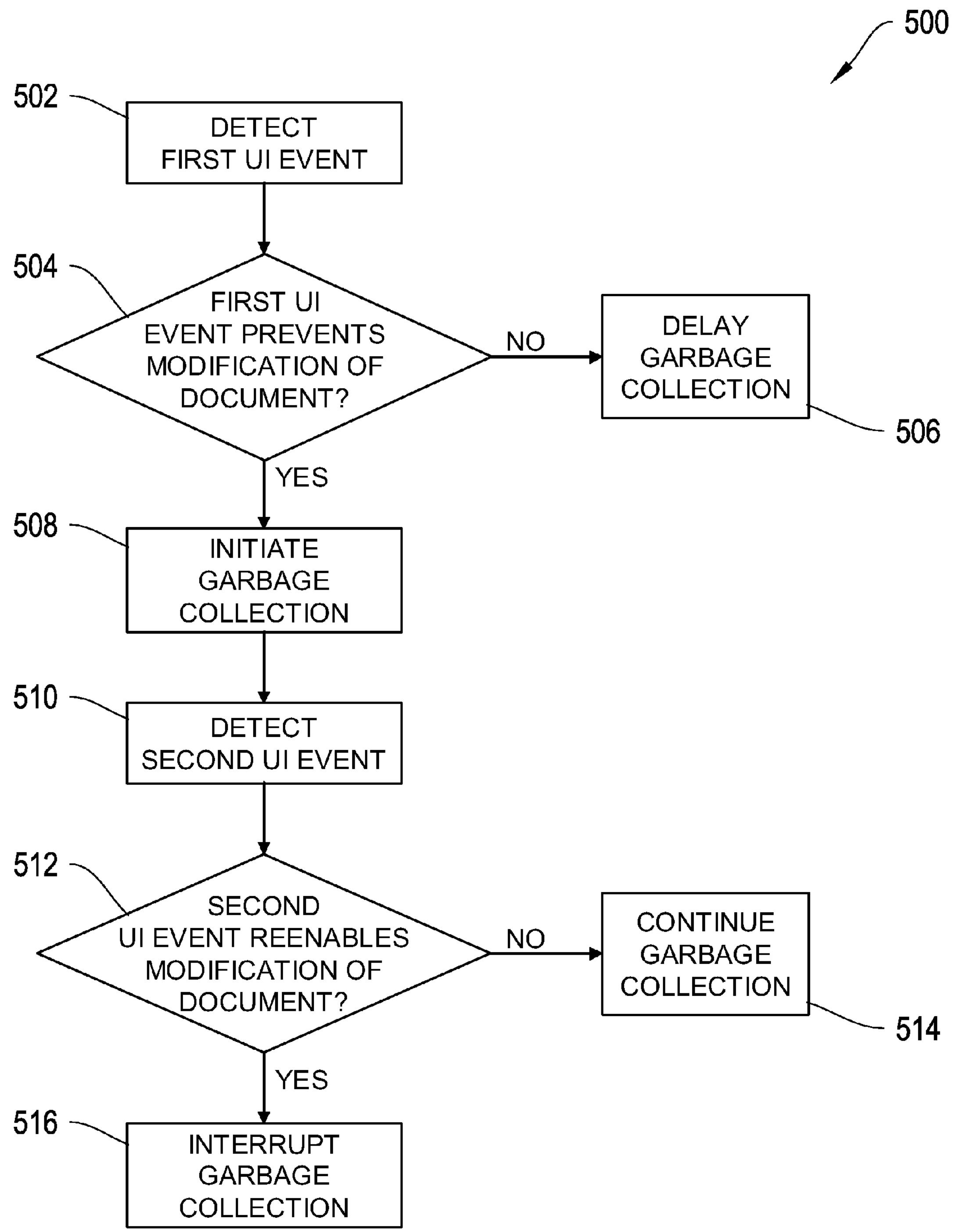
FIG. 6 is a flowchart of a method of scheduling garbage collection in which the garbage collection process is interrupted by a second user interface event, according to an illustrative embodiment of the invention.

FIG. 6 is a flowchart of a method 500 of scheduling garbage collection in which the garbage collection process can be interrupted by a second user interface event, according to an illustrative embodiment of the invention. The first portion of the method 500 is similar to the method 300 described above and illustrated in FIG. 3. Steps 502-508 in the method 500 generally correspond respectively to steps 302-308 in the method 300. First, an application, such as the application 102, detects a first user interface event (step 502). Next, application 102 determines if the first user interface event prevents modification of an electronic document being processed by the application 102 (step 504). If modification of the document is not prevented, then garbage collection is delayed (step 506). Otherwise, a garbage collection process is initiated (step 508). The remaining portion of the method 500 is described further below.

After the initiation of the garbage collection process (step 508), the application 102 detects a second user interface event (step 510). The second user interface event is any type of user interface event, such as in the examples described previously.

Next, the application 102 determines if the second user interface event reenables modification of the electronic document being processed by the application 102. One example of an event that reenables modification is the termination of an animation associated with the first user interface event, such as when the user stops scrolling or panning. If the second user interface event does not reenable modification of the document, then the garbage collection process continues. Otherwise, the application 102 interrupts the garbage collection process if it has not yet completed.

In various implementations, one or more components of the application 102, such as the application 102 or the controller logic 200, performs one or more of the steps of the method 500.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of scheduling garbage collection for a computer application comprising:

detecting a user interface event by a computer running the computer application;

determining by the computer whether the user interface event prevents user modification of program data being processed by the computer application, wherein the user interface event, when executed, causes the computer application to execute a function associated with an animation that lasts a performance time longer than a predetermined threshold;

in response to determining that the user interface event prevents user modification of the program data being processed by the computer application, initiating garbage collection by the computer, wherein the garbage collection process is masked by the user interface event so there is no noticeable pause to the user;

scaling the performance time of the animation to last at least an expected time duration of a garbage collection process, wherein scaling the performance time of the animation increases a time duration of the animation;

detecting a second user interface event that reenables user modification of the program data; and in response to detecting the second event, interrupting the garbage collection.

2. The method according to claim 1, wherein initiating garbage collection comprises initiating garbage collection on a portion of memory not associated with the memory used to implement the animation.

3. The method according to claim 2, comprising, subsequently initiating a second garbage collection process on the remaining memory associated with implementing the animation after the animation is complete.

4. The method according to claim 1, wherein the program data comprises an electronic document.

5. The method according to claim 4, wherein the animation comprises one of a scrolling and a panning of the electronic document.

6. The method according to claim 4, wherein the user interface event comprises an instruction to the computer application to process a second electronic document.

7. The method according to claim 4, wherein the user interface event comprises an instruction to transition between discrete portions of the electronic document.

8. The method according to claim 7, wherein the discrete portions comprise one of slides of a presentation, pages of a document, and sheets of a spreadsheet.

9. A system for scheduling garbage collection for a computer application, comprising:

a processor, a memory storing computer executable instructions, which when executed by the processor cause the processor to:

detect a user interface event;

determine whether the user interface event prevents user modification of program data being processed by the computer application, wherein the user interface event, when executed, causes the computer application to execute a function associated with an animation that lasts a performance time longer than a predetermined threshold;

in response to determining that the user interface event prevents user modification of the program data being processed by the computer application, initiate garbage collection, wherein the garbage collection process is masked by the user interface event so there is no noticeable pause to the user;

scale the performance time of the animation to last at least an expected time duration of a garbage collection process, wherein scaling the performance time of the animation increases a time duration of the animation;

detect a second user interface that reenables user modification of the program data; and in response to detecting the second event, interrupt the garbage collection.

10. The system according to claim 9, wherein initiating garbage collection comprises initiating garbage collection on a portion of memory not associated with the memory used to implement the animation.

11. The system according to claim 10, wherein the computer executable instructions, when executed by the processor cause the processor to subsequently initiate a second garbage collection process on the remaining memory associated with implementing the animation after the animation is complete.

12. The system according to claim 9, wherein the program data comprises an electronic document.

13. The system according to claim 12, wherein the animation comprises one of a scrolling and a panning of the electronic document.

14. The system according to claim 12, wherein the user interface event comprises an instruction to the computer application to process a second electronic document.

15. The system according to claim 12, wherein the user interface event comprises an instruction to transition between discrete portions of the electronic document.

16. The system according to claim 15, wherein the discrete portions comprise one of slides of a presentation, pages of a document, and sheets of a spreadsheet.

17. A method of scheduling garbage collection for a computer application comprising:

detecting a user interface event by a computer running the computer application, wherein the user interface event, when executed, causes the computer application to execute a function associated with an animation that lasts a performance time longer than a predetermined threshold;

determining by the computer whether the animation prevents user modification of program data being processed by the computer application;

scaling the performance time of the animation to last at least an expected time duration of a first garbage collection process, wherein scaling the performance time of the animation increases a time duration of the animation;

in response to determining that the user interface event prevents user modification of the program data being processed by the computer application:

initiating the first garbage collection process by the computer on a portion of memory not associated with the memory used to implement the animation, wherein the first garbage collection process is masked by the user interface event so there is no noticeable pause to the user, and initiating a second garbage collection process by the computer on the remaining memory associated with implementing the animation after the animation is complete, wherein the second garbage collection process is masked by the user interface event so there is no noticeable pause to the user, and detecting a second user interface event that reenables user modification of the program data; and in response to detecting the second event, interrupting the first garbage collection process and the second garbage collection process.

18. A system for scheduling garbage collection for a computer application, comprising:

a processor, a memory storing computer executable instructions, which when executed by the processor cause the processor to:

detect a user interface event which when executed, causes the computer application to execute a function associated with an animation that lasts a performance time longer than a predetermined threshold;

determine whether the user interface event prevents user modification of program data being processed by the computer application;

scale the performance time of the animation to last at least an expected time duration of a first garbage collection process, wherein scaling the performance time of the animation increases a time duration of the animation;

in response to determining that the user interface event prevents user modification of the program data being processed by the computer application:

initiate the first garbage collection process on a portion of memory not associated with the memory used to implement the animation, wherein the first garbage collection process is masked by the user interface event so there is no noticeable pause to the user, and initiate a second garbage collection process on the remaining memory associated with implementing the animation after the animation is complete, wherein the second garbage collection process is masked by the user interface event so there is no noticeable pause to the user, and detect a second user interface event that reenables user modification of the program data; and in response to detecting the second event, interrupt the first garbage collection process and the second garbage collection process.

19. A method of scheduling garbage collection for a computer application comprising:

detecting a user interface event by a computer running the computer application;

determining by the computer whether the user interface event prevents user modification of program data being processed by the computer application, wherein the user interface event, when executed, causes the computer application to execute a function associated with an animation that lasts a performance time longer than a predetermined threshold;

in response to determining that the user interface event prevents user modification of the program data being processed by the computer application, initiating garbage collection by the computer, wherein the garbage collection process is masked by the user interface event so there is no noticeable pause to the user;

scaling the performance time of the animation to last at least an expected time duration of a garbage collection process, wherein scaling the performance time of the animation increases a time duration of the animation; and continuing to prevent user modification of the program data until completion of the garbage collection.

20. A system for scheduling garbage collection for a computer application, comprising:

a processor, a memory storing computer executable instructions, which when executed by the processor cause the processor to:

detect a user interface event;

determine whether the user interface event prevents user modification of program data being processed by the computer application, wherein the user interface event, when executed, causes the computer application to execute a function associated with an animation that lasts a performance time longer than a predetermined threshold;

in response to determining that the user interface event prevents user modification of the program data being processed by the computer application, initiate garbage collection, wherein the garbage collection process is masked by the user interface event so there is no noticeable pause to the user;

scale the performance time of the animation to last at least an expected time duration of a garbage collection process, wherein scaling the performance time of the animation increases a time duration of the animation; and continue to prevent user modification of the program data until completion of the garbage collection.

* * * * *